L. REICHART.
SHUTTER ACTUATING DEVICE FOR CAMERAS.
APPLICATION FILED JULY 3, 1920.
1,405,162.
Patented Jan. 31, 1922.
2 SHEETS—SHEET 2.
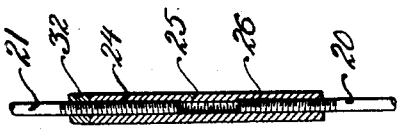
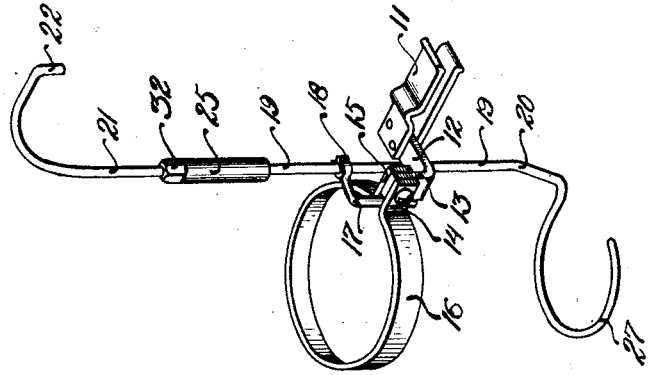
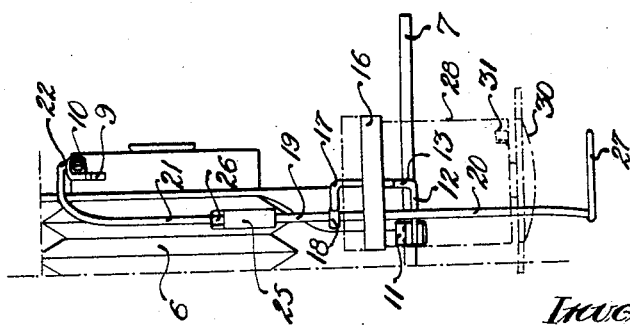
Witnesses
Geo. A. Gruss
Augustus B. Coppes
Inventor
Louis Reichart
By Joshua R. H. Potts
His Attorney

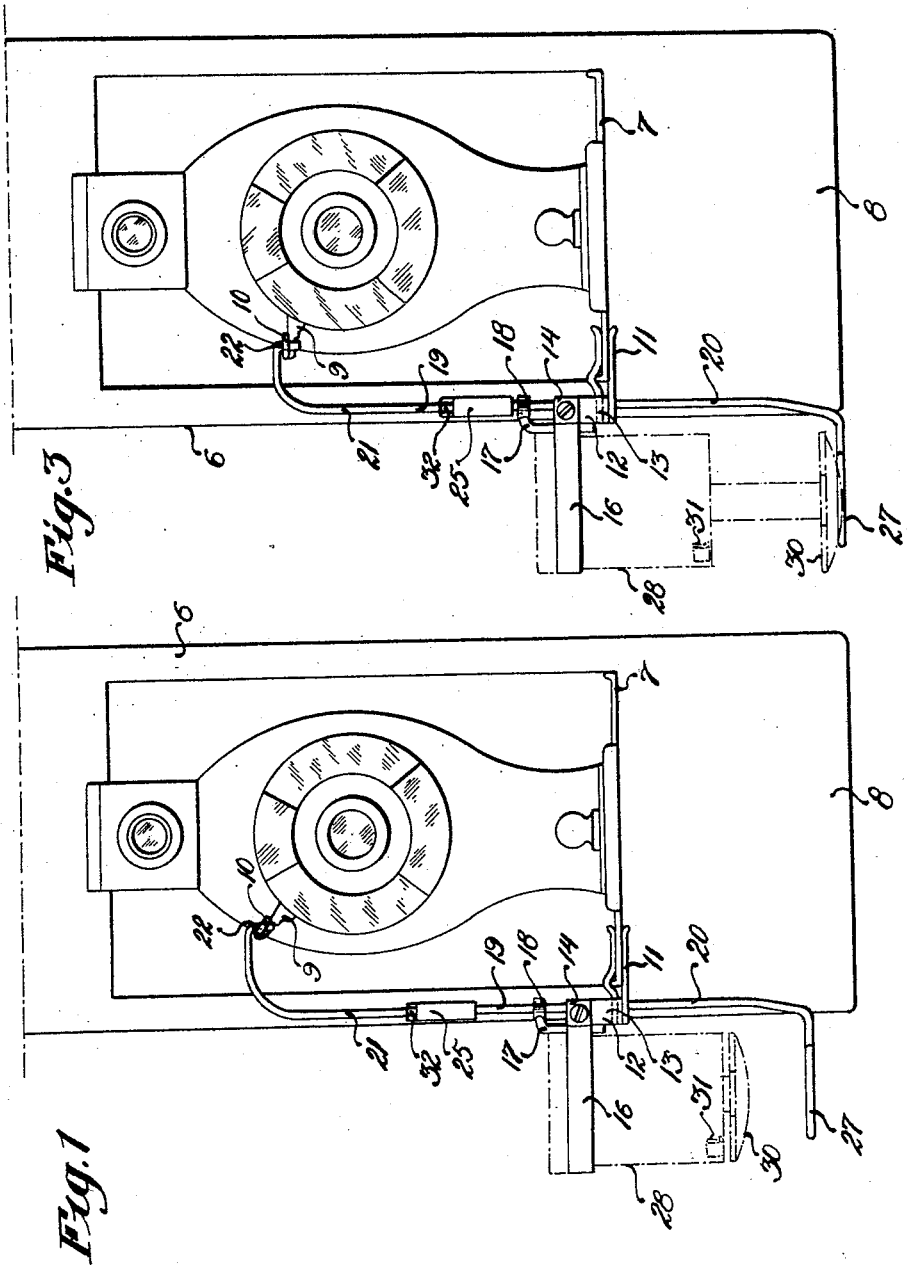

UNITED STATES PATENT OFFICE.

LOUIS REICHART, OF PHILADELPHIA, PENNSYLVANIA, ASSIGNOR OF ONE-HALF TO FRANK PETZ, OF PHILADELPHIA, PENNSYLVANIA.

SHUTTER-ACTUATING DEVICE FOR CAMERAS.

1,405,162.     Specification of Letters Patent.     Patented Jan. 31, 1922.

Application filed July 3, 1920. Serial No. 393,993.

*To all whom it may concern:*

Be it known that I, LOUIS REICHART, a citizen of the United States, residing at Philadelphia, in the county of Philadelphia and State of Pennsylvania, have invented certain new and useful Improvements in Shutter-Actuating Devices for Cameras, of which the following is a specification.

One object of my invention is to provide a device for use in connection with automatic timers for operating the finger release shutter-controlling levers of cameras to enable a person to take a picture of himself or in with a group, etc.

Another object is to make the device of my present invention of a simple and durable construction which can be easily and quickly attached to practically all types of cameras having finger release shutter control levers thereon.

These objects, and other advantageous ends which will be described hereinafter, I attain in the following manner, reference being had to the accompanying drawings in which Figure 1 is a front elevation of a folding camera having my invention connected thereto, Figure 2 is a fragmentary side elevation of Figure 1, Figure 3 is a view of the same general character as Figure 1 showing the device having been operated, Figure 4 is a perspective view illustrating my invention, and Figure 5 is a fragmentary view, partly in section, showing means for adjusting the length of a sectional actuating rod which forms a part of my invention.

Referring to the drawings, 6 represents a folding camera such for example as the well known "Kodak" which includes a base 7 which can be swung into an open horizontal position and the casing 8 of the camera may be supported on a tripod or other supporting structure. The camera 6 is of a type including a finger release lever 9 which is usually provided with a hole 10; said hole ordinarily being for the purpose of the attachment of a string to permit the lever 9 to be actuated to open and close the shutter of the camera.

My invention, as illustrated, preferably includes a spring clip 11 designed to be slipped over the edge of the base 7 of the camera so as to firmly clamp upon said base. The clip 11 projects from an arm 12; said arm having an upwardly extending portion 13 which engages between two outwardly bent ends 14 and 15 of a band 16. A bracket 17 is also positioned between the ends 14 and 15 of the band 16 and has a fork 18, the tines or furcations of which are made of resilient material and are contracted toward their outer ends to permit an actuating rod 19 to be slipped within the fork through the opening between the outer ends of the furcations; said actuating rod 19 being of greater diameter than the normal distance between the ends of the furcations but of less diameter than the distance between the furcations at a position further within the fork as clearly shown in Figure 4. Thus the actuating rod is prevented from accidentally moving out of the fork but has a free movement so as to slightly move laterally and is also free to move upwardly and downwardly in the fork as a guide. The actuating rod 19 is made in two sections 20 and 21. The upper section 21 has a downwardly extending hooked end 22 adapted to extend downwardly through the hole 10 in the finger release lever 9 of the camera. The bottom end of the upper section 21 of the actuating rod is screw threaded and fits within a tapped opening 24 of a turn buckle 25. The upper end of the lower section 20 of the actuating rod is also screw threaded and fits within a tapped opening 26 in the bottom of the turn buckle 25; the screw threads of the ends of the sections 20 and 21 extending in opposite directions. In other words right and left hand threads are provided on the adjacent ends of the sections 20 and 21. Thus by turning the turn buckle 25 the length or distance between the opposite ends of the actuating rod 20 can be varied to suit adjustment for various types of cameras as will be understood more thoroughly from the following description.

The band 16 is adapted to surround and clamp any suitable automatic timer which includes a plunger or other movable part which may be automatically released and will move automatically downward toward the looped end 27 of the actuating rod 19, such for example as the well known "Kodak" self timer which is illustrated in dot-and-dash lines 28; said timer including a plunger 30 which can be released by the movement of a lever 31 and slowly move downwardly until it engages the looped end 27 of the actuating rod 19 and thereby cause the actuating rod to be lowered to pull the release lever 9 downwardly to effect the operation of the shutter of the camera. Considering, of course, that the shutter is timed for a "snap shot" exposure in which a single downward movement of the lever 9 will effect the opening and successive closing of the shutter. The weight of the actuating rod normally tends to keep the hooked end 22 in the hole 10 of the release lever but said weight of the rod 19 is not sufficient to move the lever 9 downwardly.

To detach the device from the camera it is merely necessary to push the rod 10 up and the device and automatic timer can then be moved laterally until the spring clip 11 is pulled off of the side portion of the base 7. Any adjustment necessary to suit variation in normal and operating distance between the lever 9 and the base 7 can be made by turning the turn buckle 25 and a lock nut 32 is preferably provided on said rod 19 in order to prevent accidental movement between the turn buckle and the sections of the rod 19.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with an automatic self timer having a part automatically movable, of an arm supporting said self timer independently of the movable part and having a part adapted to be detachably secured to a camera, said arm providing a guideway; and a rod slidably mounted in said guideway and having a portion projecting into the path of movement of said movable part of the timer and another portion adapted to engage the shutter release lever of said camera whereby the rod will be moved by said movable part of the timer to actuate said shutter release lever; substantially as described.

2. The combination with an automatic self-timer having a part automatically movable, of a slidably mounted rod having an angularly extending portion including a loop positioned in the path of movement of said movable part of the timer and another portion adapted to engage the shutter release means of a camera; substantially as described.

3. The combination with an automatic self timer having a part automatically movable, of an arm supporting said self timer independently of the movable part and having a part adapted to be detachably secured to a camera, said arm providing a guideway; a fork supported by said arm; and a rod slidable lengthwise in said fork and having a portion projecting into the path of movement of said movable part of the timer and another portion adapted to engage the shutter release lever of said camera whereby the rod will be moved by said movable part of the timer to actuate said shutter release lever; substantially as described.

4. The combination with a camera having shutter actuating means and an automatically operative self-timer including a part automatically movable, of means for connection to said camera, said means including a part adapted to surround and clamp a portion of said timer in a position fixed relatively to said movable part of the timer; and means interposed between said movable part of the timer and said shutter actuating means, said connecting means having a portion serving as a guide for said interposed means, said interposed means adapted to be moved by said movable part of the timer and to move said shutter actuating means; substantially as described.

In testimony whereof I have signed my name to this specification in the presence of two subscribing witnesses.

LOUIS REICHART.

Witnesses:
 ELIZABETH GARBE,
 CHAS. E. POTTS.